US007006890B2

(12) United States Patent
Foygel

(10) Patent No.: US 7,006,890 B2
(45) Date of Patent: Feb. 28, 2006

(54) SYSTEM AND METHOD FOR MANAGING WORK LOAD DISTRIBUTION AMONG A PLURALITY OF IMAGE OUTPUT DEVICES

(75) Inventor: Dan Foygel, Oakland, CA (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/726,453

(22) Filed: Dec. 3, 2003

(65) Prior Publication Data

US 2005/0125094 A1 Jun. 9, 2005

(51) Int. Cl.
*G06F 7/00* (2006.01)

(52) U.S. Cl. .......................................... 700/213; 399/8

(58) Field of Classification Search ................ 700/213; 399/8, 75, 82; 270/1.01, 1.02
See application file for complete search history.

(56) References Cited

U.S. PATENT DOCUMENTS 4,167,322 A * 9/1979 Yano et al. ................... 700/19
5,051,779 A * 9/1991 Hikawa ....................... 399/84
5,287,194 A * 2/1994 Lobiondo ................... 358/296
5,339,168 A * 8/1994 Evanitsky et al. .......... 358/402
5,689,755 A * 11/1997 Ataka ........................... 399/8
6,104,468 A * 8/2000 Bryniarski et al. ........... 355/18
6,157,436 A * 12/2000 Cok ............................ 355/40

* cited by examiner

*Primary Examiner*—Khoi H. Tran
(74) *Attorney, Agent, or Firm*—Frank Pincelli

(57) ABSTRACT

A method, system, and computer software program for controlling operation of a photofinishing lab having a plurality of output devices for producing a plurality of different output products for a plurality of different job orders wherein each of the output devices capable of outputting one or more of the plurality of different output products. The system includes a controller for monitoring and controlling operations of the plurality of different output devices with respect to the job orders in queue. A display device connected to the controller displays the operational status of each of the plurality of the output devices in a predetermined format. The controller producing a visual indication when the operational efficiency reaches a predetermined criteria and automatically adjusting the operational status of at least one of the plurality of output devices or prep device for in response to reaching the predetermined criterion.

12 Claims, 5 Drawing Sheets

SYSTEM AND METHOD FOR MANAGING WORK LOAD DISTRIBUTION AMONG A PLURALITY OF IMAGE OUTPUT DEVICES

FIELD OF THE INVENTION

The present invention relates to a method and system for controlling a plurality of jobs or orders among a plurality of output devices. The present invention is particularly adapted in managing a plurality of various print orders among a plurality of image output devices in a photofinishing environment.

BACKGROUND OF THE INVENTION

In photofinishing labs that handle thousands of print orders daily from a variety of customers, it is important that the job orders be quickly and efficiently sent through the system. For example, the lab must be prepared to make a variety of different size image product. For example, 4×6; 5×7; 8×10 and poster size prints. In addition, the lab often is required to provide different type finishes such as glossy and mat. An important aspect requirement of high volume photofinishing labs is the need to return the order to the customer within a relatively short period of time. Quite often delivery is required within one or two days. This may involve shipping of the order by a variety of different shipping methods in order to accommodate appropriate time requirement for fulfillment of the order. In addition, many photofinishing labs are associated with various different retailers which require different notations, packing slips and various other associated items to be provided with the order. As a result, in order to have the ability to provide many different products to the variety of different customers in an efficient manner, there is usually required a number of different pieces of output devices to produce the many various products.

A problem with many various prior art systems is that there is no way of knowing if there is a problem in one area of the lab and there is a relatively complex method for rerouting of orders to accommodate difficulties in the current system.

The present invention is directed to providing an efficient system whereby job orders can be routed automatically to the most efficient output device and provide means for allowing quick and easy rerouting of orders in the event that there is a problem with certain output devices.

SUMMARY OF THE INVENTION

In accordance with one aspect of the present invention there is provided a system for controlling operation of a photofinishing lab having a plurality of output devices for producing a plurality of different output products for a plurality of different job orders, each of the output devices capable of outputting one or more of the plurality of different output products, comprising:

- a controller for monitoring and controlling operations of the plurality of different output devices, the controller monitoring the operational configuration at each of the plurality of output devices and at least one criteria with respect to the job orders in queue;
- a display device connected to the controller for displaying the operational status of each of the plurality of the output devices in a predetermined format, the predetermined format including information relating to the current configuration status of the plurality of different output devices, the current backlog of the job orders in queue for each of the plurality of different output products, the controller producing a visual indication when the operational efficiency reaches a predetermined criteria and automatically adjusting the operational status of at least one of the plurality of output devices in response to reaching the predetermined criteria.

In accordance with another aspect of the present invention there is provided a method for controlling operation of a photofinishing lab having a plurality of output devices for producing a plurality of different output products for a plurality of different job orders and a controller for distributing job orders to the plurality of devices, each of the output devices capable of outputting one or more of the plurality of different output products, comprising the steps of:

- monitoring operations of the plurality of different output devices by the controller with respect to the job orders in queue;
- displaying the operational status of each of the plurality of the output devices in a predetermined format, the predetermined format including information relating to the current configuration status of plurality of different output devices, the current backlog of the job orders in queue for each of the plurality of different output products; and
- the controller producing a visual indication when the operational efficiency reached a predetermined criterion and automatically adjusting the operational status of at least one of the plurality of response to the monitoring.

In accordance with still another aspect of the present invention there is provided a method for controlling operation of a photofinishing lab having a plurality of output devices for producing a plurality of different output products for a plurality of different job orders, each of the output devices capable of outputting one or more of the plurality of different output products, comprising the steps of:

- monitoring and controlling operations of the plurality of different output devices by the controller;
- the controller placing the plurality of different job orders in queue among the plurality of different output devices;
- the controller periodically analyzing the status of the plurality of different job orders in queue; and
- the controller redistributing the plurality of different job orders in queue among the plurality of different output devices based on the analysis and at least one predetermined criterion.

In accordance with still another aspect of the present invention there is provided a system for controlling operation of a photofinishing lab having a plurality of output devices for producing a plurality of different output products for a plurality of different job orders, each of the output devices capable of outputting one or more of the plurality of different output products, comprising:

- a controller for monitoring and controlling operations of the plurality of different output devices, the controller monitoring the operational configuration at each-of the plurality of output devices and at least one criteria with respect to the job orders in queue;
- a display device connected to the controller for displaying the operational status of each of the plurality of the output devices in a predetermined format, the predetermined format including information relating to the current configuration status of the plurality of different output devices, the current status of the job orders in queue for each of the plurality of different output devices and products, the controller automatically balancing the job orders in queue among the plurality of output devices in response to reaching the at least one predetermined criterion.

In accordance with another aspect of the present invention there is provided a computer software program for use in a computer for controlling operation of a photofinishing lab having a plurality of output devices for producing a plurality of different output products for a plurality of different job orders and a controller for distributing job orders to the plurality of devices, each of the output devices capable of outputting one or more of the plurality of different output products, the software program when loaded on the computer will cause the computer to perform the steps of:

monitor operations of the plurality of different output devices by the controller with respect to the job orders in queue;

display the operational status of each of the plurality of the output devices on a display device in a predetermined format, the predetermined format including information relating to the current configuration status of plurality of different output devices, the current backlog of the job orders in queue for each of the plurality of different output products; and the controller producing a visual indication when the operational efficiency reached a predetermined criterion and automatically adjusting the operational status of at least one of the plurality in response to the monitoring.

In accordance with still another aspect of the present invention there is provided a computer software program for use in a computer for controlling operation of a photofinishing lab having a plurality of output devices for producing a plurality of different output products for a plurality of different job orders and a controller for distributing job orders to the plurality of devices, each of the output devices capable of outputting one or more of the plurality of different output products, the software program when loaded on the computer will cause the computer to perform the steps of:

monitoring and controlling operations of the plurality of different output devices by the controller;

the controller placing the plurality of different job orders in queue among the plurality of different output devices;

the controller periodically analyzing the status of the plurality of different job orders in queue; and the controller redistributing the plurality of different job orders in queue among the plurality of different output devices based on the analysis and at least one predetermined criterion.

In accordance with still another aspect of the present invention there is provided a method for controlling operation of a photofinishing lab having a plurality of output devices for producing a plurality of different output products for a plurality of different job orders, a controller for distributing job orders to the plurality of devices, each of the output devices capable of outputting one or more of the plurality of different output products, and a prep device for preparing job order for assignment by the controller, comprising the steps of:

monitoring operations of the plurality of different output devices by the controller with respect to the job orders in queue; and the controller accelerating the process of the image prep for job orders in order to meet the need for additional job orders by at least one of the plurality of different output devices.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
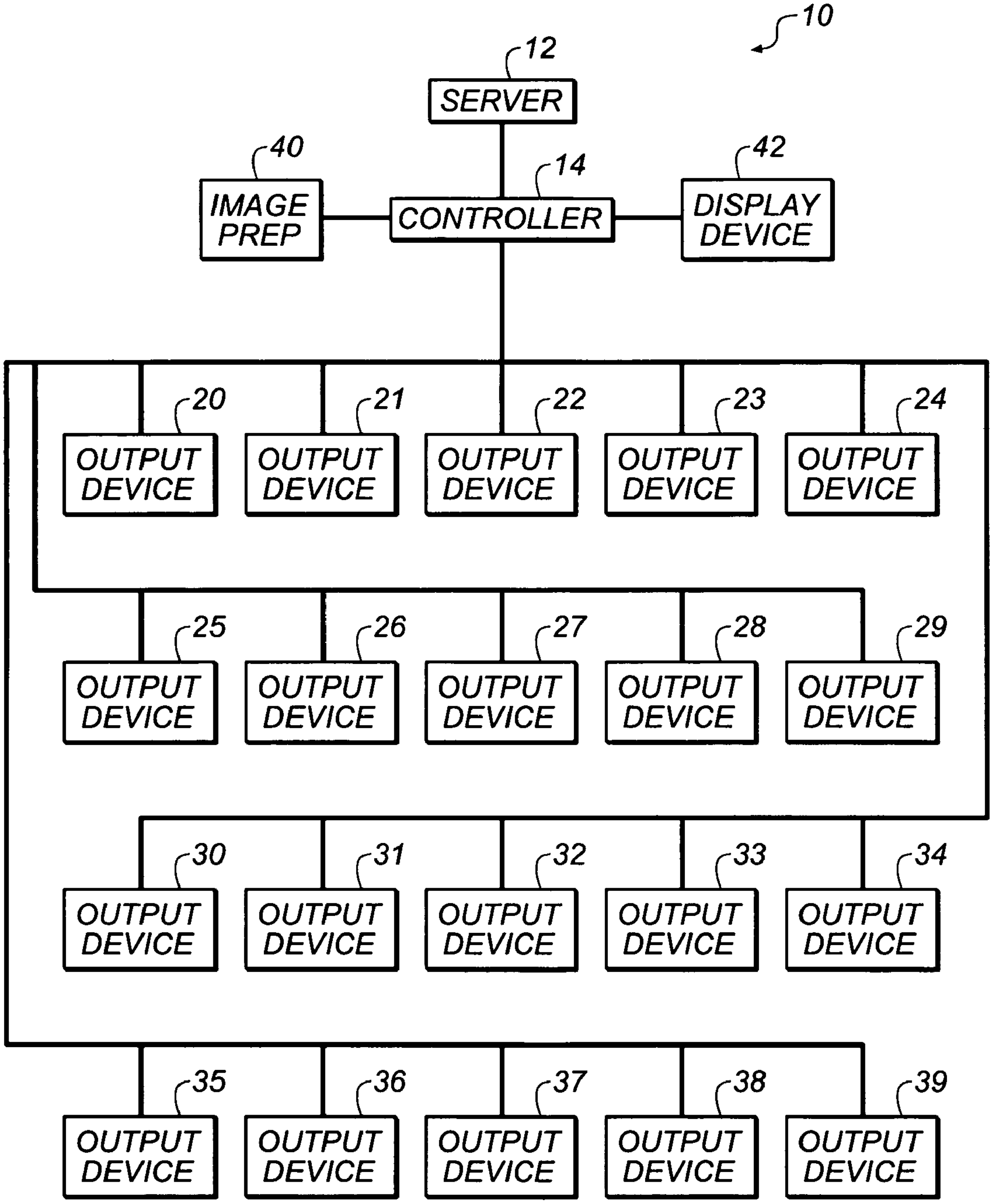
FIG. 1 is a diagrammatic representation of a system made in accordance with the present invention.

Referring to FIG. 1, a system 10 is made in accordance with the present invention for producing a variety of different image products. The system 10 includes a server 12 that receives a variety of orders of various customers. For example, but not limited to, the server 12 may be a server located at a facility whereby orders may be provided electronically, for example, over the Internet, or by providing films that are to be developed, scanned and turned into digital images which are associated with orders for customers. The system 10 includes a controller 14 which oversees and controls the distribution of job orders among a plurality of various output devices. In the particular embodiment illustrated, there are twenty output devices indicated by numerals 20–39. It is to be understood that the system 10 may have as many or few output devices as desired. Each of the devices 20–39 is capable of producing one or more type output products. In addition, the devices may be of various type capabilities. For example, some may be devices such as mini-labs for outputting silver halide prints wherein some of the devices may be capable of producing 4×6 and 5×7 prints where others may be capable of producing 8×10 and 4×6 prints. In addition, many of these devices may be output devices for producing large format image products such as posters. They may be of an inkjet type or some other digital printing technique. Other devices may be used to produce other image products such as CDs, image transfers for use in putting images on T-shirts, etc. The system 10 further includes an image prep device 40 that is used for preparing images for the particular output device and product to be produced. The system 10 also includes a display device 42 for illustrating the operational status of the job orders and printers in the system.

Figure 2:
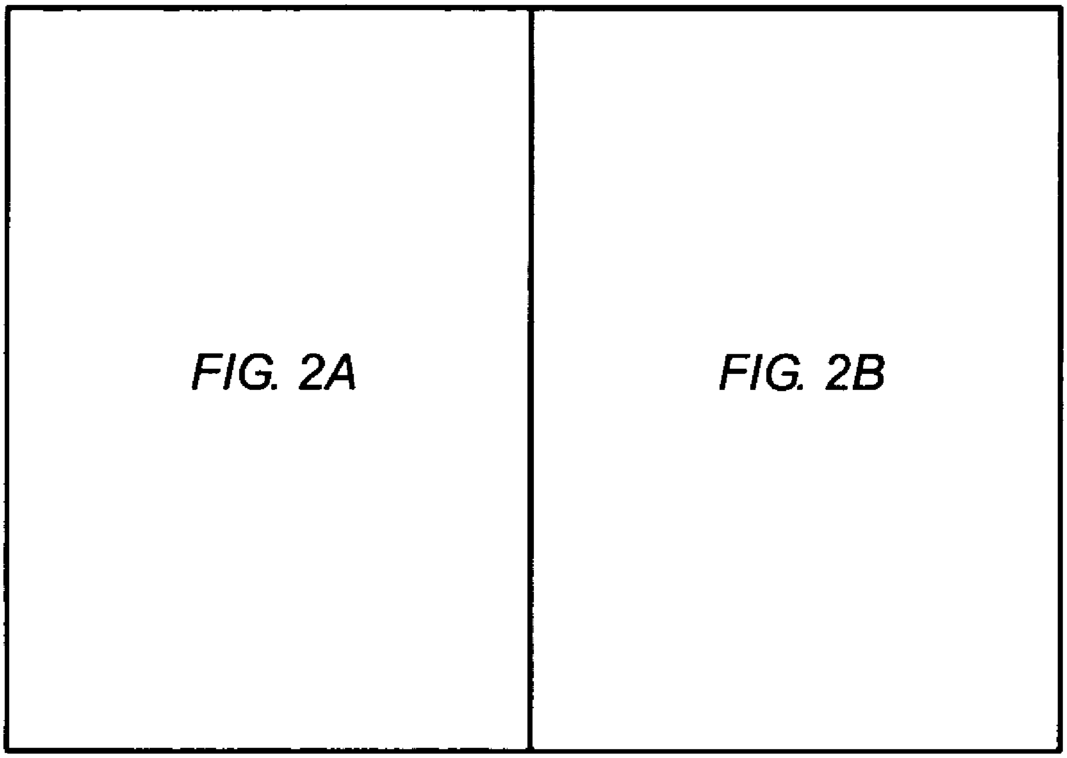
FIGS. 2, 2A and 2B illustrate is a visual display of the operational status of the system of FIG. 1.
Figure 2A:
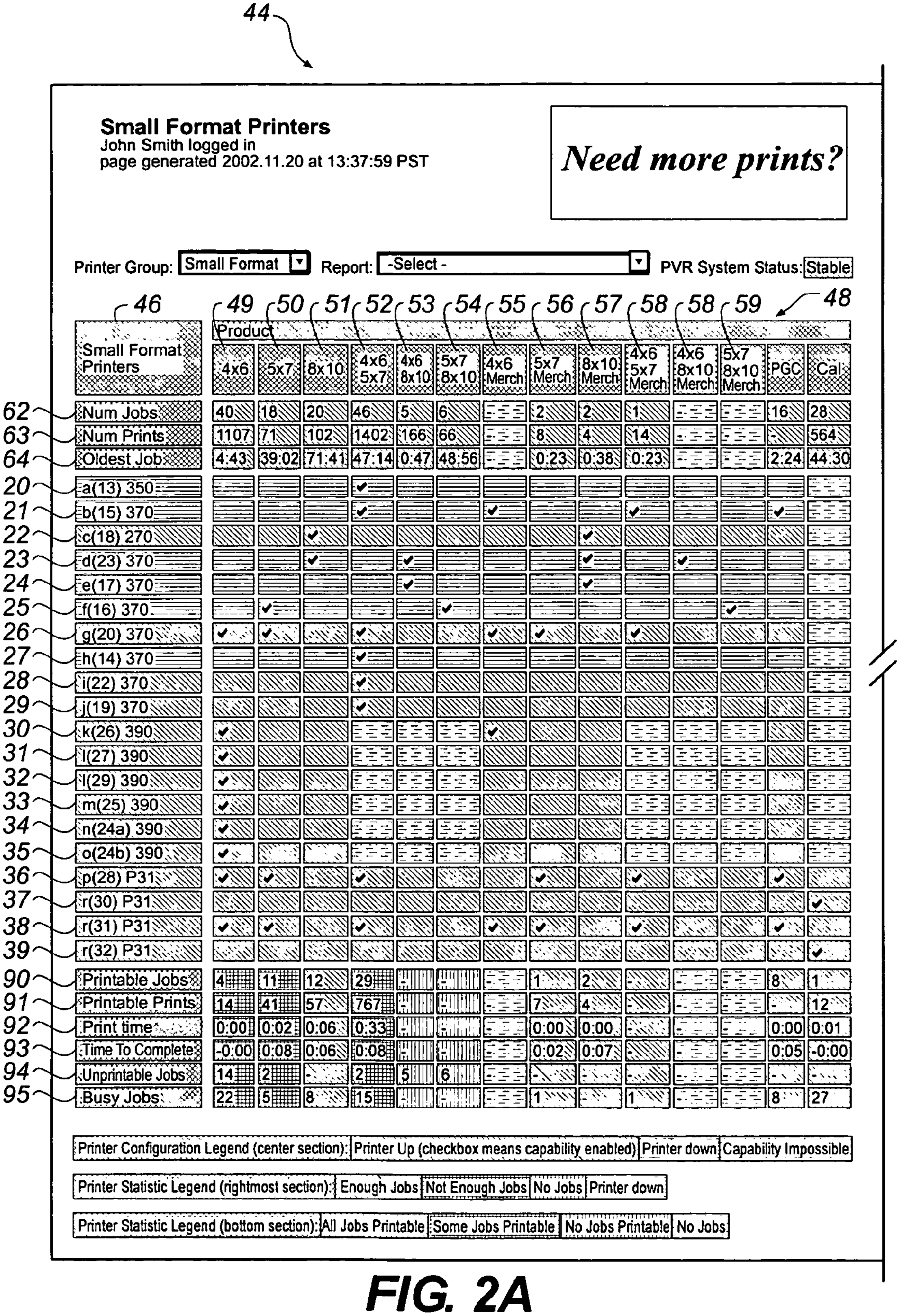
Figure 2B:
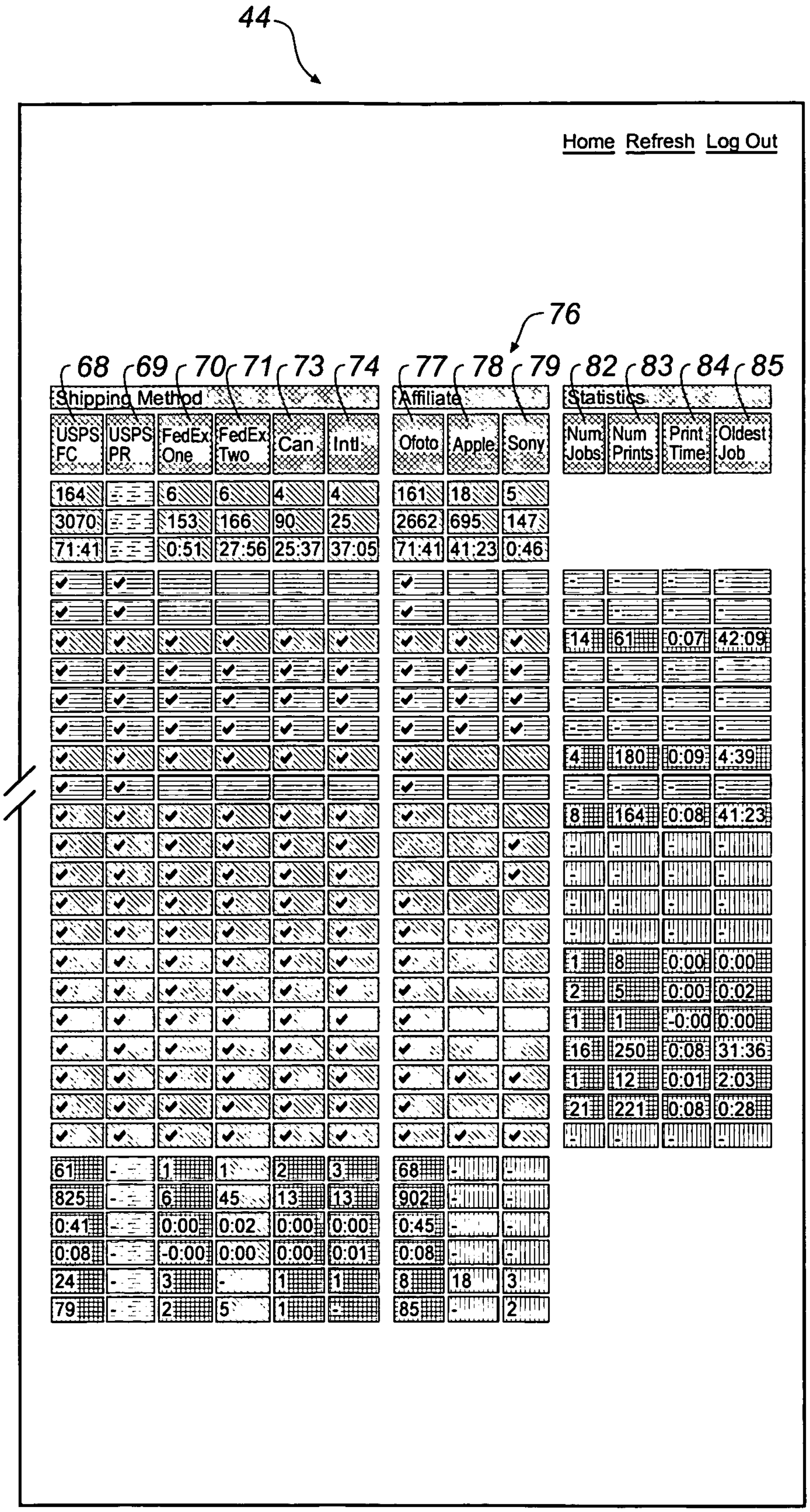

FIGS. 2, 2A and 2B illustrate a visual display that is produced by display device 42 which illustrates the operational status of the various devices in system 10 obtained from information gathered by controller 14 from the various output device. In the particular embodiment illustrated, display screen 44 illustrates the status of the various small format printers. In column 46, the various output devices 20–39 are illustrated. The screen display 44 includes a central section 40A which sets forth the different output capabilities of the various output devices. Column 49 illustrates whether the device can produce 4×6 prints, column 50 illustrates whether the device can produce 5×7, column 51 illustrates whether the device could produce 8×10 prints. Columns 52–59 illustrate various other output capabilities. Rows 62, 63 and 64 indicate the number of jobs that are present in the device, the number of prints to be produced and the time of the longest job present at the printer. The columns 68, 69, 70, and 71 illustrates the various methods of shipping the orders. Columns 73 and 74 illustrate the various locations for shipping, for example, Canada and other International locations, countries other than where the lab is located. The section 76 includes three columns 77, 78 and 79 which illustrate the various different retail establishments associated with various customers. For example, companies, A, B or C. In the last set of columns are statistics for the various devices. In particular, column 82 illustrates the number of jobs, column 83 illustrates the number of prints, column 84 illustrates the print time and column 85 illustrates the oldest job.

The various rows 90, 91, 93, 94, 95 and 96 illustrate various features of the various type output products. For example, 90 illustrates the number of printable jobs. Row 91 illustrates the number of printable prints. Row 92 illustrates the print time to complete the last job. Row 93 illustrates the time to complete the job. Row 94 illustrates the number of unprintable jobs and row 95 illustrates the number of busy jobs. In addition, it can be seen that there are a number of check marks throughout the entire display. The checks in section 48, illustrate the current configuration capabilities of each of the output devices. The check marks under shipping methods illustrate the capabilities of the prints being shipped from those devices and the check marks on the affiliate section illustrates which printers are capable of producing products for a particular associate.

The display 44 is also color coded so as to provide information as to the status in job orders. For example, the color code green could indicate that the printer is up and running or it has enough jobs to continue operating and that all jobs are printable. The color yellow could indicate that there are not enough jobs for that particular section. The color red could indicate that there are either no jobs or no jobs that are printable and is an indication that items in that area may need to be reviewed for further processing either by another output device or that there is something potentially wrong with the device. The color gray could indicate that certain functions are not capable of being provided or that no jobs are present. Rows 62, 63, 64 are of particular importance in that they provide information relating to the amount of time that the oldest job is printed and provide the quantity as to the number of print jobs present and the prints to be produced. The time is set forth in hours and minutes, however, the time may be displayed in any units desirable. In certain areas for example, the producing of 4×5 and/or 5×7 prints, it is desirable that they maintain the time as short as possible. Whereas, in prints that are being produced by 8×10 prints, it may be acceptable to have longer times for the oldest job. These can be set based on the expected delivery time and the type of shipping method to be produced. If and when a value in one of these locations exceeds a predetermined value, an alarm either visually and/or audibly may be produced to alert an operator that something has gone beyond a desired set limit. In which case, the operator may decide that images of a particular device should be rerouted to another device or the reconfiguration of another device be set up so that the work load can be properly balanced. The operator would then manually enter the desired instructions to the controller 14 to effectuate the desired action.

In order to better understand the present invention, a description of workflow through the system will now be described.

Figure 3:
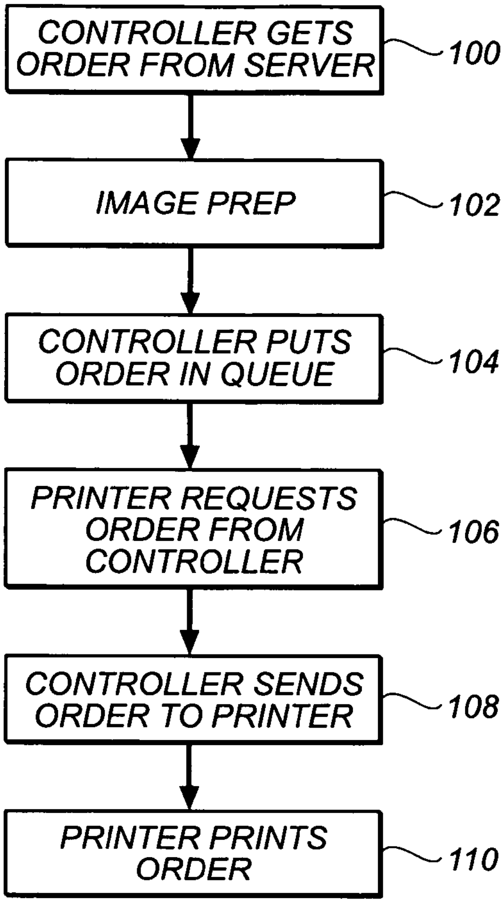
FIG. 3 is a flow diagram of the overall operation of the system of FIG. 1.

Referring to FIG. 3, there is illustrated a flow chart of how the work proceeds through the system 10. At step 100, the controller 14 is programmed with a software program such that the controller 14 can get customer orders from server 12 and perform the other appropriate steps as discussed later herein. The customer order comprises of a plurality of images, customer identification number and the type of output product being ordered. The appropriate images at step 102 are then appropriately manipulated by image prep 40 so that they will be in appropriate form for printing and for providing the best possible image. The display device 42 illustrates the status of the various customer orders.

Customer orders may comprise a variety of different products, for example, a number of 4×6 prints in addition to one or more 8×10 prints. Of course, any customer order may comprise a single type print or any combination thereof image products. The customer order is then broken down into job orders that are to be performed by various output devices.

The controller 14, in accordance with its programmed software, puts the various job orders in a queue at step 104. The job orders in the queue are there for the various output devices 20–39. Each device is designed to maintain a particular number of job orders in its own buffer sufficient for it to run continuously. When a device determines that the job orders in its buffer are insufficient for maintaining a continuous mode operation, the device will go to the controller 14 to obtain appropriate additional jobs that are in queue for that particular device for printing. It is preferred that the buffer at each of the output devices be as small as possible so that throughput in the system is most efficient. Thus, it is desirable to maintain the amount of job orders at each of the printers as minimal as possible. The controller 14, at predetermined periodic time intervals, analyzes the job orders in queue to determine the status of the job orders and redistribute the job orders among the various devices in order to maintain efficiency in the system and/or meet predetermined criteria for producing of job orders. In the particular embodiment illustrated, the periodic time interval is about two (2) minutes, however this time interval may be as short or long as appropriate to maintain the desired efficiency or predetermined criteria for producing job orders. An example of a predetermined criterion is that the order must be printed and shipped by a particular time. Thus, in order to meet this criterion, a particular job order can be moved up in the queue for a particular device or sent to a different device that can complete the job sooner. Another criterion could be the type of shipping method selected for a product to be produced and that a particular device is better suited to provide this type of shipment. Another criterion could simply be the balancing of the workload for the various output devices. Yet another example is that the controller determined that the output of a particular device has been interrupted, the job orders in queue for that particular device can be redistributed among the other devices that are operating. It is, of course, understood that any criteria may be programmed into controller 14 in which to distribute and/or redistribute the various job orders in the queue.

As the job order in the buffer of the device goes below a minimum value, the output devices access the controller 14 at step 108 which will then release the appropriate job orders in queue for that particular device to the requesting output device. At step 110, the output device produces the desired output product.

In another scenario, the queue for a particular output device may not have enough jobs available for the controller 14 to assign to it before there is a risk that the output device may need to shutdown. In this case, the controller 14 is aware of these situations and will accelerate the process of image prep 40 for customer orders that meet the output device's configuration. The image prep 40 operation will produce job orders ready for printing and assignment to an output device queue. In this way, not only does the controller 14 balance the job orders assigned to all of the output devices for optimum efficiency, but also provides scheduling for the image prep 40 operation as part of the optimization method.

Figure 4:
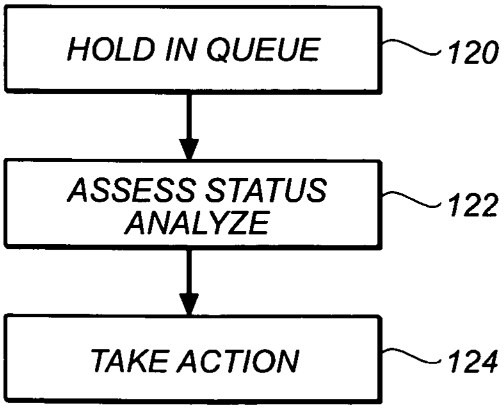
FIG. 4 is a flow diagram of the balancing action taken by the system of FIG. 1.

Referring to FIG. 4, there is illustrated a process whereby the controller 14 balances the workload among the various output devices. In particular, at step 120, the controller holds in queue the various job orders. At step 122, the controller assesses and analyzes the status of the various output devices 20–39. If the controller determines that there are not enough job orders in queue for a particular printer or that the job cannot be printed, or cannot be produced because there is no properly configured output device, or that the flow rate of images through the system and/or a particular output device, falls below a particular value, then an appropriate visual and/or audible alarm is produced. The operator, by going to display 44, can readily determine what the problem is as the problem area will be highlighted by an appropriate color, for example, red. This allows the operator to determine and take appropriate action as may be necessary at step 124. In particular, this may mean that an output device needs to be checked or be reconfigured to allow the production of the device or repair of the output device.

Another important feature is an automatic override when a predetermined criterion exists. As previously discussed, there are situations where a customer order may need to be delivered within a described time period. For example, within 24 hours. In which case, the queue at the controller 14 during its periodic analysis, may be readjusted such that a priority job order is placed to a particular machine as soon as possible and has the appropriate shipping requirements to allow the output product to be shipped within the described period. For example, a job order may be routed to a particular printing device that has capabilities for overnight shipping in order to allow a job order to be sent to a particular printer, in order for a particular quality or special handling capabilities provided by that particular output device. The controller 14 may also automatically readjust the job orders among the output devices by redistributing job orders already in queue. If the controller 14 determines that a job order can be more efficiently fulfilled at a different device, then the job order could be moved to the queue of the different output device for fulfillment. As previously noted, any appropriate criterion may be used for readjusting the job orders in queue among the various devices in the system.

It is to be understood that various other automatic features may be set up whereby the controller will either reroute or provide an appropriate visual and/or audible alarms so that the operator and/or controller may take appropriate action.

It is also to be understood that the present invention is not limited to the particular illustrated and that various modifications and changes may be made without departing from the scope of the present invention, the present invention being defined by the following claims.

PARTS LIST

10 system
12 server
14 controller
20–39 output devices
40 image prep
40A central section
42 display device
44 display screen
100 step
102 step
104 step
108 step
110 step
120 step
122 step
124 step

What is claimed is:

1. A system for controlling operation of a photofinishing lab having a plurality of output devices for producing a plurality of different output products for a plurality of different job orders, each of said output devices capable of outputting one or more of said plurality of different output products, comprising:

a controller for monitoring and controlling operations of said plurality of different output devices, said controller monitoring the operational configuration at each of said plurality of output devices and at least one criteria with respect to said job orders in queue;

a display device connected to said controller for displaying the operational status of each of said plurality of said output devices in a predetermined format, said predetermined format including information relating to the current configuration status of said plurality of different output devices, the current backlog of said job orders in queue for each of said plurality of different output products, said controller producing a visual indication when said operational efficiency of said photofinishing lab reaches a predetermined criteria and automatically adjusting the operational status of at least one of said plurality of output devices in response to reaching said predetermined criteria.

2. A system according to claim 1 wherein said information relating to operational efficiency comprises the number of job orders in queue for any of said plurality of output devices.

3. A system according to claim 1 wherein said information relating to operational efficiency comprises the shipping requirements for one of said job orders.

4. A system according to claim 1 wherein said at least one criterion comprises one of the following:

information relating to operational efficiency of each of said plurality of devices;

shipping information with respect to said job orders in queue;

number of job orders in queue at said plurality of output devices;

time to complete job orders in queue.

5. A method for controlling operation of a photofinishing lab having a plurality of output devices for producing a plurality of different output products for a plurality of different job orders and a controller for distributing job orders to said plurality of devices, each of said output devices capable of outputting one or more of said plurality of different output products, comprising the steps of:

monitoring operations of said plurality of different output devices by said controller with respect to said job orders in queue;

displaying the operational status of each of said plurality of said output devices in a predetermined format, said predetermined format including information relating to the current configuration status of plurality of different output devices, the current backlog of said job orders in queue for each of said plurality of different output products; and said controller producing a visual indication when said operational efficiency of said photofinishing lab reached a predetermined criterion and automatically adjusting the operational status of at least one of said plurality of devices in response to said monitoring.

6. The method according to claim 5 wherein said information relating to operational efficiency comprises the number job orders in queue at one of said plurality of output devices.

7. The method according to claim 5 wherein said information relating to operational efficiency comprises the shipping requirements for one of said job orders.

8. The method system according to claim 5 wherein said at least one criteria further comprises one or more of the following:

information relating to operational efficiency of each of said plurality of devices;

shipping information with respect to said job orders in queue;

number of job orders in queue at said plurality of output devices;

time to complete job orders in queue.

9. A computer software program for use in a computer for controlling operation of a photofinishing lab having a plurality of output devices for producing a plurality of different output products for a plurality of different job orders and a controller for distributing job orders to said plurality of devices, each of said output devices capable of outputting one or more of said plurality of different output products, said software program when loaded on said computer will cause said computer to perform the steps of:

monitor operations of said plurality of different output devices by said controller with respect to said job orders in queue;

display the operational status of each of said plurality of said output devices on a display device in a predetermined format, said predetermined format including information relating to the current configuration status of said plurality of different output devices, the current backlog of said job orders in queue for each of said plurality of different output products; and said controller producing a visual indication when said operational efficiency reached a predetermined criterion and automatically adjusting the operational status of at least one of said plurality of output devices response to said monitoring.

10. The software product according to claim 9 wherein said information relating to operational efficiency comprises the number job orders in queue at one of said plurality of output devices.

11. The software product according to claim 9 wherein said information relating to operational efficiency comprises the shipping requirements for one of said job orders.

12. The software product according to claim 9 wherein said at least one criteria further comprises one or more of the following:

information relating to operational efficiency of each of said plurality of devices;

shipping information with respect to said job orders in queue;

number of job orders in queue at said plurality of output devices;

time to complete job orders in queue.

* * * * *